United States Patent [19]

Petit

[11] Patent Number: 5,091,142
[45] Date of Patent: Feb. 25, 1992

[54] METHOD FOR EXTRACTING A LOCKING SLEEVE FROM A DEMOUNTABLE GUIDE TUBE OF A NUCLEAR REACTOR FUEL ASSEMBLY

[75] Inventor: Bernard Petit, L'Ermitage, France

[73] Assignees: Framatome, Courbevoie, France; Cogema, Velizy Villacoublay, France

[21] Appl. No.: 409,171

[22] Filed: Sep. 19, 1989

[30] Foreign Application Priority Data

Sep. 19, 1988 [FR] France .................. 88 12208

[51] Int. Cl.$^5$ ............................ G21C 19/32
[52] U.S. Cl. ............................ 376/261; 29/235; 29/426.6; 376/446
[58] Field of Search .......... 376/261, 260, 446; 976/DIG. 68, DIG. 264, DIG. 65; 294/906; 269/48.1; 29/906, 723, 426.4, 426.5, 426.6, 213.1, 234, 235, 255, 282

[56] References Cited

U.S. PATENT DOCUMENTS

| | | | |
|---|---|---|---|
| 4,292,130 | 9/1981 | Viaud et al. | 376/446 |
| 4,617,171 | 10/1986 | Feutrel | 376/446 |
| 4,631,168 | 12/1986 | Shallenberger et al. | 376/446 |
| 4,664,874 | 5/1987 | Shallenberger et al. | 376/261 |

FOREIGN PATENT DOCUMENTS

| | | |
|---|---|---|
| 0007251 | 1/1980 | European Pat. Off. . |
| 0140588 | 5/1985 | European Pat. Off. . |
| 0180166 | 5/1986 | European Pat. Off. . |
| 0223342 | 5/1987 | European Pat. Off. . |

*Primary Examiner*—Daniel D. Wasil
*Attorney, Agent, or Firm*—Pollock, Vande Sande & Priddy

[57] ABSTRACT

Each of the zones of the ferrule (25) comprising a radially projecting deformed part (29) is deformed by inward bending, so as to extract the deformed part (29) from a corresponding cavity (22) of the end block. The locking sleeve (20) is then extracted by exerting a pulling force on this sleeve (20) in the axial direction (ZZ') of the guide tube (4). Preferably, the ferrule (25) consists of cylindrical segments separated by slits arranged along the generatrices of the ferrule (25). A tool (31) is used to fold the segments of the ferrule (25) and to grip these segments so as to extract the locking sleeve (20). Extraction is performed underwater in a fuel storage well.

4 Claims, 5 Drawing Sheets

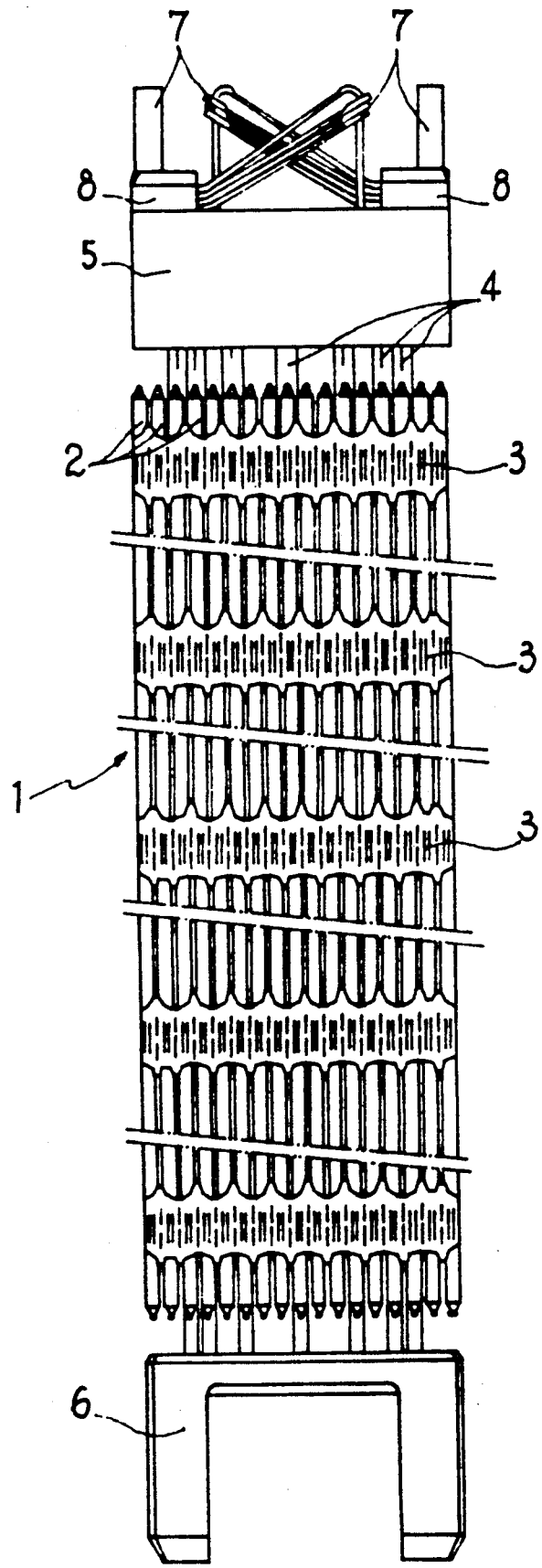
FIG_1

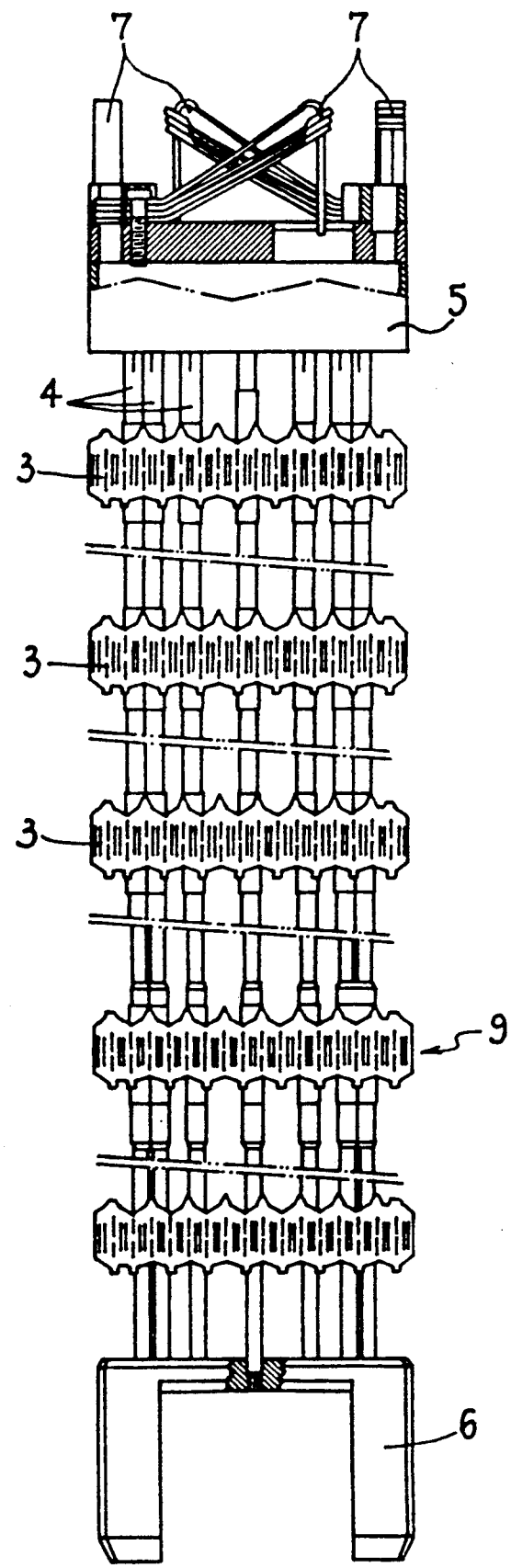
FIG_2

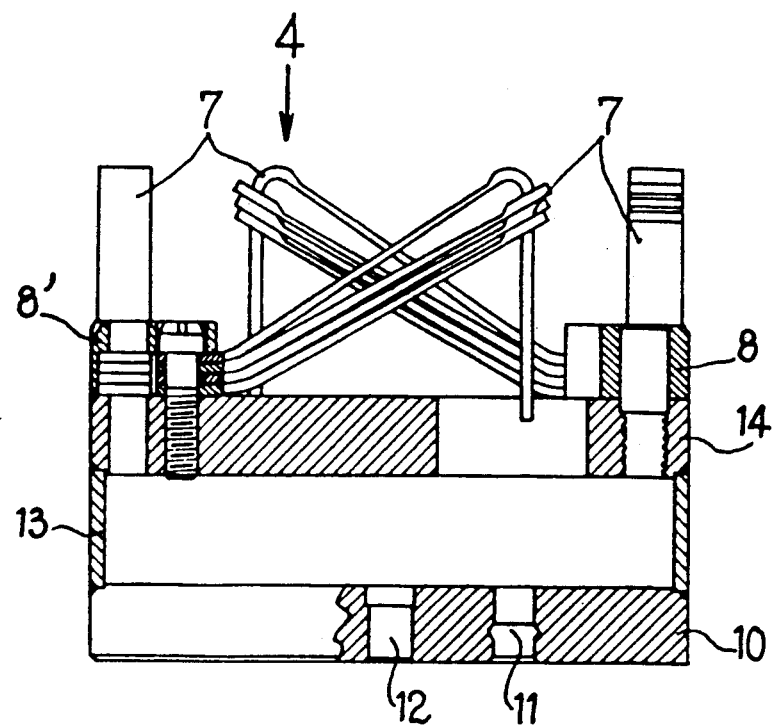
FIG_3
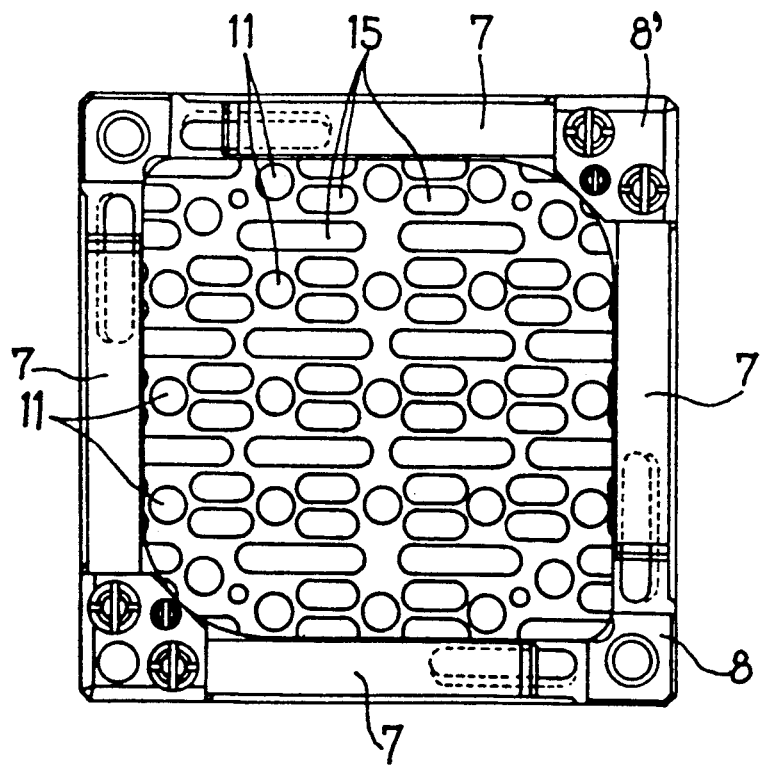
FIG_4

METHOD FOR EXTRACTING A LOCKING SLEEVE FROM A DEMOUNTABLE GUIDE TUBE OF A NUCLEAR REACTOR FUEL ASSEMBLY

FIELD OF THE INVENTION

The invention relates to a method for extracting a locking sleeve from a demountable guide tube of a fuel assembly of a nuclear reactor cooled by light water.

BACKGROUND OF THE INVENTION

Water-cooled nuclear reactors, and in particular pressurized-water nuclear reactors, comprise assemblies consisting of a bundle of fuel rods of considerable length, arranged parallel to each other and held inside a framework formed by guide tubes, struts and two end blocks. The guide tubes are arranged in the longitudinal direction of the assembly and are connected to transverse struts regularly spaced along the length of the assembly.

The guide tubes are also connected at each of their ends to one of the two end blocks forming parts for rigidifying and closing the assembly.

The fuel rods of the assembly form a bundle in which the rods are parallel to each other and arranged, in the transverse sections of the assembly, in a regular latticework determined by the struts. Certain positions of the latticework are occupied by guide tubes which are generally rigidly connected to the struts.

The guide tubes are lower than the fuel rods and are positioned inside the bundle, so as to comprise a part projecting relative to the bundle of fuel rods at each of their ends. The end blocks are fixed onto these projecting parts of the guide tubes so as to ensure closure of the assembly at each of its ends.

The fuel rods consist of sintered pellets of nuclear fuel material stacked inside a metal sheath isolating the pellets from the fluid surrounding the fuel assembly. In the event of rupture of a sheath of a fuel assembly rod, this rod must be replaced very rapidly in order to avoid leakages of radioactive product into the cooling fluid of the reactor. In order to gain access to the fuel rods and carry out replacement thereof, one of the end blocks of the assembly must be demounted, by disconnecting the corresponding ends of the guide tubes from the end block.

The end blocks comprise through-holes reproducing the latticework of the guide tubes, in each of which a guide tube is engaged and fixed.

So as to be able to replace defective rods in the fuel assemblies, new fuel assemblies have been designed and developed, comprising guide tubes, the connection of which with at least one of the end block is demountable.

In order to carry out replacement of the defective fuel rods, the assembly is placed under water in the vertical position, inside a well such as a storage well; the assembly rests on the bottom of the well via its bottom end block. The other end block, i.e., the top end block, is accessible at a certain water depth from the top of the well.

In prior art demountable fuel assemblies, the parts of the guide tubes engaged in the top end block of the assembly comprise a radially expandable part which may, for example, be mounted on the end of the guide tube. This expandable part may consist of a slit bush having a part radially projecting outwards which is intended to be accommodated inside a cavity of corresponding shape machined inside the end block, in the through-hole of the guide tube. A locking sleeve introduced inside the guide tube effects radial expansion of the slit bush and securing of the guide tube, the radially projecting part of which is accommodated inside the cavity machined in the end block.

Only a certain length of the guide tube is engaged in the hole passing through the adapter plate of the end block, the remaining part of the hole, above the guide tube, emerging on the upper surface of the adapter plate of the end block.

A demountable connection for the guide tube of a fuel assembly of the type described above is known, comprising a locking sleeve having a part ensuring expansion of the guide tube extended axially by a fixing ferrule which is accommodated, when the locking sleeve is arranged in position inside the guide tube, in the part of the hole situated above the guide tube and emerging on the upper surface of the adapter plate. Radial cavities are provided in this part of the hole of the adapter plate and the fixing ferrule is deformed, after arranging the locking sleeve in position inside the guide tube, such that the deformed parts of this fixing ferrule fit inside the cavities so as to achieve axial and rotational locking of the locking sleeve.

Effective fixing of the guide tube is thus possible by means of operations which can be carried out, without difficulty, from the top of the assembly.

However, demounting of the guide tube requires that, initially, the locking sleeve which is held inside the end block by the fixing ferrule be extracted. This operation may be performed by a tool which is introduced into the sleeve and which comprises parts, movable in radial directions, which are positioned under the bottom end of the sleeve. A pulling force is exerted on the tool so as to allow the fixing ferrule to be unlocked and the sleeve of the guide tube to be extracted.

This operation of extracting the locking sleeves before demounting the top end block of the assembly requires the use of a complex tool and the application of pulling forces which are all the greater the more effectively the sleeve is fixed by means of the ferrule.

Generally speaking, the methods for extracting locking sleeves known from the prior art make use of large pulling forces and/or perform extraction by means of striking a tool placed against the bottom part of the locking sleeve, which may result in damage to the assembly during demounting of its top end block.

SUMMARY OF THE INVENTION

The object of the invention is therefore to propose a method for extracting a locking sleeve from a guide tube in a demountable end block of a fuel assembly of a nuclear reactor cooled by light water comprising a bundle of parallel fuel rods held inside a framework formed by guide tubes, struts and end blocks fixed onto the ends of the guide tubes, at least one of the end blocks being fixed onto one of the ends of each of the guide tubes in a demountable manner, by means of an end part of the guide tube deformable radially and having a securing part projecting radially outwards, engaged inside and over a part of the length of an opening passing through the end block and comprising, in its part receiving the guide tube, an annular enlargement intended to receive the securing part of the guide tube, radial expansion of the end of the guide tube and holding of its securing part inside the annular enlargement of the opening of the end block being ensured by a locking sleeve comprising a bush for expanding the guide tube and a ferrule for fixing in the end block projecting at the end of the guide tube, in the locked position of the sleeve, inside a part of the opening of the end block not receiving the guide tube, this part of the opening of the end block comprising at least one radial cavity inside which at least one deformed part of the fixing ferrule is introduced by means of radial deformation of at least one zone of the ferrule positioned so as to coincide with the cavity, so as to ensure fixing of the locking sleeve in the end block, it being possible for this extraction method to be applied without subjecting the assembly to repeated impacts and without exerting a large pulling force on the sleeve.

To this end:
the zone or zones of the fixing ferrule comprising a radially projecting deformed part are deformed by inward folding inwards, so as to extract the deformed part from the corresponding cavity,
then the locking sleeve is extracted by exerting a pulling force in the axial direction of the guide tube.

BRIEF DESCRIPTION OF THE DRAWINGS

So that the invention may be more clearly understood, a description now follows, with reference to the appended drawings, of an embodiment for carrying out the method according to the invention and of a tool for extracting locking sleeves enabling this method to be implemented.

FIG. 1 is an elevation view of a fuel assembly of a pressurized-water nuclear reactor.

FIG. 2 is an elevation view of the framework of the assembly shown in FIG. 1.

FIG. 3 is a partially sectioned elevation view of the top end block of the fuel assembly.

FIG. 4 is a plan view in the direction of arrow 4 shown in FIG. 3.

DESCRIPTION OF PREFERRED EMBODIMENT

Figure 5:
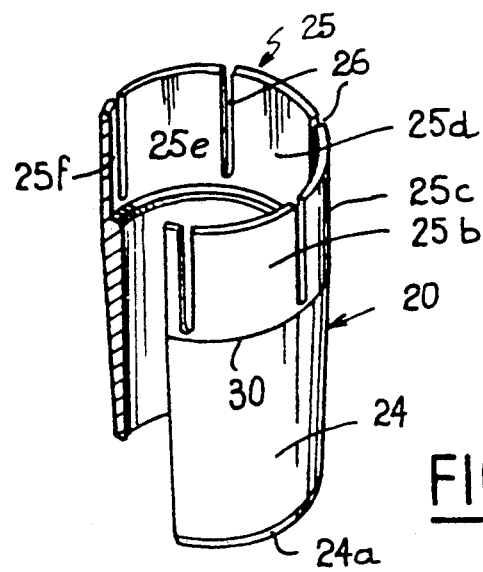
FIG. 5 is a cut-away perspective view of a locking sleeve facilitating implementation of the method according to the invention.

FIG. 1 shows a fuel assembly 1 consisting of a bundle of parallel fuel rods 2 held by struts 3 arranged with certain spacing along the length of the rods 2. The struts 3 consist of grids, the cells of which each receive a fuel rod. Certain positions in the latticework of the grids are occupied by guide tubes 4, which are longer than the fuel rods 2.

The guide tubes 4 are connected at one of their ends to an end block 5 forming the top end block of the fuel assembly and at their other end to a second end block 6 forming the bottom end block.

When the assembly is in the underwater storage position inside a well, the top end block 5 is accessible from the top of the well. This top end block 5 carries leaf springs 7 ensuring holding of the assembly inside the reactor core, the upper core plate of which rests on the springs 7. The end block also comprises studs 8 projecting relative to its upper surface.

FIG. 2 shows the framework 9 of the fuel assembly comprising guide tubes 4, struts 3 and the end blocks 5 and 6. This framework 9 serves as a housing for the fuel rods 2 of the bundle which may be introduced or extracted from the framework when the top end block 5 is removed. In order to effect replacement or removal of rods, demountable connections between the end of the guide tubes 4 and the top end block 5 are provided.

FIGS. 3 and 4 show a top end block of a fuel assembly comprising an adapter plate 10 into which the guide tubes engage, inside openings 11 passing through this adapter plate and accessible from the top part of the fuel assembly. The instrumentation (side tube of the fuel assembly situated in the central part is received inside an opening 12 having a special shape. The top end block of the assembly consists of the adapter plate 10 and a frame 14 connected together by means of a skirt 13 welded onto the plate 10 and onto the frame 14. The frame 14 has bosses 8 comprising centering openings and flanges 8' for holding the springs 7.

As can be seen in FIG. 4, the through-holes 11 allowing fixing of the guide tubes 4 are arranged in defined positions corresponding t the positions of the twenty-four guide tubes of the assembly. Water flow holes 15 pass through the adapter plate 10 of the end block between the through-openings 11 of the guide tubes.

FIG. 5 shows a locking sleeve 20, facilitating implementation of the method according to the invention.

This locking sleeve comprises a lower part 24 having an external surface of frustoconical shape which forms the part of the locking sleeve ensuring expansion of the guide tube and an upper part consisting of a cylindrical ferrule 25 forming the ferrule for fixing the locking sleeve in the end block of the fuel assembly.

The ferrule 25 consists of six cylindrical segments 25a, 25b, 25c, 25d, 25e and 25f separated from one another by slits 26 arranged in the direction of the generatrices of the ferrule 25.

The cylindrical segments 25a to 25f are identical, the slits 26 being arranged at 60° from one another about the axis of the locking sleeve 20.

The expansion bush 24 of the locking sleeve, which is frustoconical in shape, comprises an internal bore of substantially cylindrical shape, such that the thickness of the wall of this bush 24 decreases from its large base at the level of which the ferrule 25 is connected, along the line 30, to its small base, at the level of which an inclined frustoconical surface 24a is provided, facilitating engagement of the locking sleeve inside the guide tube.

The expansion bush 24 of the locking sleeve, which is relatively thick, has sufficient rigidity to ensure effective holding of the guide tube, as will be explained herein below.

The ferrule 25 is substantially less thick than the expansion bush 24, in particular in the vicinity of the junction line 30, i.e., the large base of the part 24. The locking sleeve 20 has an internal radially projecting shoulder 28 ending in an inclined frustoconical surface 28a directed towards the inside of the sleeve.

The sleeve 20 may also be made as a single machined piece or, alternatively, the ferrule 25 may be mounted on the top part of the frustoconical holding part 24. The slits 26 may be cut from the ferrule 25, after machining or assembly of the sleeve.

In all cases, the cylindrical segments 25a to 25f forming the ferrule 25 may be deformed by pushing inside locking cavities in the end block of the fuel assembly, and by folding about a line situated in the vicinity of the line 30.

Figure 6:
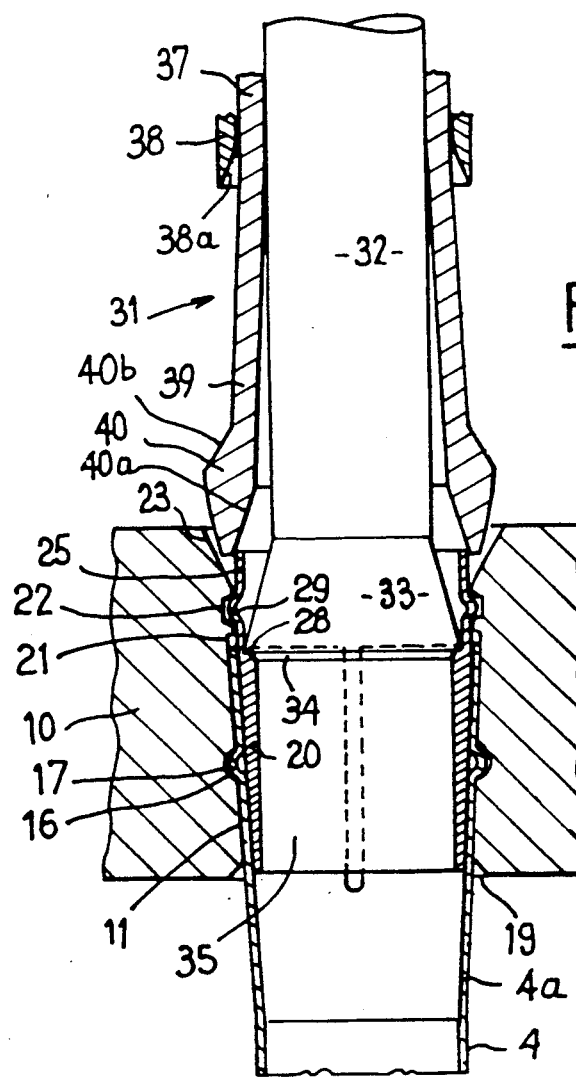
FIG. 6 is an axially sectioned view of the bottom part of a tool for extracting a locking sleeve, in position inside the sleeve, before the start of the first extraction phase.

FIG. 6 shows the adapter plate 10 of a top end block of a fuel assembly, in the vicinity of a through-opening 11 in which the end 4a of a guide tube 4 is engaged.

The upper end 4a of the guide tube 4 has been formed prior to introduction into the opening 11, so as to fit perfectly in the inlet part of this opening which has a slightly frustoconical shape and which comprises an annular enlargement 16.

The upper part 4a of the tube 4 has a frustoconical shape corresponding to the shape of the inlet part of the opening 11, and an annular securing part 17, radially projecting outwards, intended to fit into the annular enlargement 16 of the plate 10, when the tube 4 is positioned inside the opening 11.

The frustoconical inlet part of the opening 11 ends in a shoulder 21 projecting radially towards the inside of the opening 11. It should be noted that the end of the tube 4, when the latter is completely engaged inside the opening 11, does not rest on the shoulder 21. As a result of preforming, the tube car: be arranged in place without difficulty and very precisely inside the end block without the formation of any tearing support.

The opening 11 has, at its inlet end on the lower surface of the adapter plate 10, a frustoconical enlargement 19 for facilitating introduction of the tube 4.

The upper part or outlet part of the opening 11, situated above the shoulder 21, comprises a ring-shaped radial cavity 22.

Above the cavity 22, the opening 11 forms an outlet part 23 widening out and emerging on the upper surface of the adapter plate 10.

Figure 7:
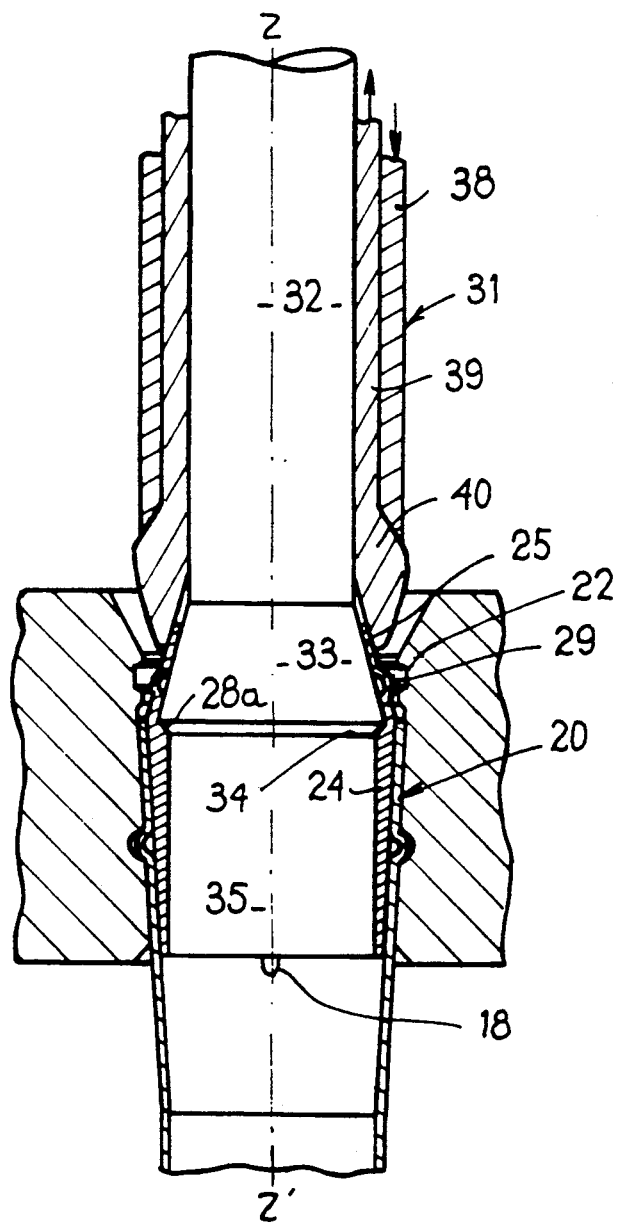
FIG. 7 is an axially sectioned view similar to FIG. 6, of the tool, at the end of the first extraction phase.

The reassembly of a fuel assembly comprising guide tubes and connection means as shown in FIGS. 6 and 7 may be performed underwater in the storage well of the nuclear reactor fuel assemblies, as follows.

The fuel assembly rests via its bottom end block on the bottom of the well, the guide tubes of the assembly being in the vertical position. The top part of these guide tubes onto which the adapter plate 10 of the end block 5 is engaged is located at a water depth sufficient to protect the operators carrying out the reassembly. Engagement of the adapter plate onto the ends 4a of the guide tubes does not pose any difficulty, the guide tubes being held in a precise transverse arrangement by the struts of the assembly. Moreover, as a result of the preformed ends of the guide tubes, the guide tubes can be engaged and arranged in position precisely inside the through openings of the adapter plate.

The top part 4a of each of the guide tubes is made so as to be deformable radially in order to allow it to be engaged inside the opening 11 and then expanded so as to secure the projecting parts 17 inside the annular enlargements 16. To this end, at least two slits such as 18 arranged at 180° relative to one another separate the top part 4a of the guide tube into at least two frustoconical segments deformable in the radial direction.

After arranging in position the top end block on the end of the guide tubes, these guide tubes are fixed by means of locking sleeves 20, such as those shown in FIG. 5 and using a tool 31 such as that shown in FIGS. 6 and 7.

The tool 31 consists of a pole of considerable length, the bottom part 32 of which can be seen in FIGS. 6 and 7. The pole of the tool 31 is fixed at the top to a holding and raising means such as a rolling bridge serving the fuel well, and may be displaced inside well, with its axis ZZ' in the vertical position.

The bottom part 32 of the pole comprises, in sequence from top to bottom, a cylindrical part, a frustoconical bearing part 33 widening outwards, a frustoconical thrusting surface 34 directed inward, and a cylindrical end part 35.

The end part 35 of the bottom part 32 of the pole comprises means for retaining a locking sleeve (not shown). These retaining means may consist, for example, of curved leaf springs, the convexity of which is directed outwards and which are fixed in the axial direction, on the external surface of the end part 35.

Such retaining devices are described in a copending patent application filed by applicant on the same day as the present application.

The tool 31 comprises two tubular-shaped components (37) and 38, the first of which 37 is slidably mounted on the cylindrical part of the pole situated above the frustoconical surface 33, and the second of which (38) is slidably mounted around the first.

The first sliding component 37 comprises slits in its bottom part defining radially deformable segments 39, the bottom part 40 of which forms a gripping jaw.

The component 37 on which the component 38 is slidably mounted forms a clamping chuck, the bottom parts 39 of which may be displaced radially between a first position shown in FIG. 6, and a second position shown in FIG. 7.

The sliding jacket 38 is connected, at the top (not shown), to an axial displacement device allowing it to be displaced between its respective positions shown in FIGS. 6 and 7, respectively.

Each of the gripping jaws 40 of the component 37 comprises a frustoconical internal bearing surface 40a and a frustoconical external bearing surface 40b.

The sliding jacket 38 comprises a frustoconical bearing surface 38a at the bottom.

In order to carry out reassembly of the end block of a fuel assembly, use is made of a sleeve supplying device arranged inside the well, in the vicinity of the end block to be reassembled. Such a supply device has been described in a copending patent application filed by applicant on the same day as the present application.

The tool 31 is positioned so as to be able to introduce the end part 35 of the pole into the cylindrical internal bore of the holding bus 24 of a sleeve located in the supply device. The end part 35 engaged inside the sleeve, as a result of its retaining devices, enables the sleeve to be removed and introduced, via the widened out end 23, into an opening 11 of the adapter plate 10 inside which a guide tube 4 is engaged. A thrusting force is exerted on the pole of the tool 31, the bottom part 32 of which is in contact with the shoulder 28 and the surface 28a of the sleeve 20, by means of a shoulder and the frustoconical bearing surface 34, respectively. The thrusting force transmitted to the sleeve 20 enables the latter to be introduced inside the tube 4 in the locked position, as shown in FIG. 6. An adjusting wedge enables the position of the pole of the tool 31 to be precisely determined in order to introduce the sleeve 20.

The pole of the tool 31 is then raised so as to disengage its end part 35 from the sleeve 20, which remains in position inside the guide tube which it fixes.

Using a known type of tool, a part of each of the cylindrical segments 25a to 25f is pushed into the cavity 22 of the top part of the opening 11 of the plate 10 of the end block.

The deformed parts 29 thus obtained, engaged inside the cavity 22, enable the sleeve 20 to be axially locked relative to the end block.

The guide tube 4 is thus perfectly fixed inside the demountable end block.

In order to carry out demounting of the end block, the locking sleeves 20 engaged inside the guide tubes and fixed inside the adapter plate of the end block must be extracted.

For this purpose, a tool 31 is used, which initially is brought underneath the assembly located underwater inside the well and engaged inside the sleeve 20, as shown in FIG. 6. The pole of the tool 31 abuts against the shoulder 28 and the bearing surface 28a via the shoulder of the part 33 and the bearing surface 34. The gripping jaws 40 of the chuck member 37 are then engaged inside the frustoconical opening 23, around the top end of the ferrule 5.

The actuating jacket 38 is lowered, thereby radially folding the segments 39 of the component 37 inwards.

FIG. 7 shows the final position of the segments 39, at the end of the downward movement of the jacket 38. During their pivoting movement inwards, the segments 39 come into contact with the top part of the cylindrical segments 25a to 25f of the ferrule 25, which they fold inwards until the segments come into contact with the frustoconical surface 33.

Towards the end of its downward movement, the actuating jacket 38 comes into contact, via its surface 38a, with the bearing surface 40b of the component 37, which has a certain freedom of sliding movement around the end 32 of the pole. As a result of the downward sliding movement of the component 37, folding of the segments of the ferrule 25 is facilitated and the ferrule 25 is properly gripped by the gripping jaws 40, as shown in FIG. 7.

Folding of the segments of the ferrule 25 has allowed the deformed parts 29 of these segments to be disengaged from the cavity 22.

The locking sleeve 25 is therefore no longer held inside the opening of the adapter plate by the fixing ferrule.

The sleeve 20 may be easily extracted by raising the pole of the tool 31, using the raising means fixed to the top part thereof. It is sufficient, in fact, to overcome the clamping forces of the frustoconical holding bush 24 inside the tube 4, these forces being very much less than those required for disengaging the deformed parts such as 29 from the radial cavity. Moreover, the ferrule 25 is firmly held by gripping between the bearing surfaces 40a of the gripping jaws 40 and the frustoconical surface 33.

Extraction of the locking sleeves is therefore obtained without difficulty as a result of the method of the invention.

It is possible to use the method according to the invention to perform the extraction of locking sleeves of a type different from that which has been described in which the fixing ferrule consists of successive cylindrical segments separated by slits.

The method according to the invention can also be used in the case of sleeves comprising deformable tongues, cut in the fixing ferrule, which may be pushed outwards into cavities of the end block when the locking sleeve is fixed, and folded inwards in order to disengage them from the cavities, when the sleeve is extracted.

It is also possible to use a fixing ferrule having folding lines allowing the parts of the ferrule between two folding lines to be folded down and the deformed parts to be disengaged from the corresponding cavities.

In the case where the fixing ferrule consists of cylindrical segments, separated by slits, there may be any number of segments, and only part of these segments may comprise parts deformed inside cavities provided in the end block.

The tool for performing extraction of the locking sleeves may be different from that which has been described. This tool may carry out only extraction of the sleeve, or both positioning and extraction.

The tool may also consist of a plate carrying a set of extraction spindles arranged in a latticework reproducing the arrangement of the guide tubes of one or more fuel assemblies and each formed in the same manner as the extraction tool described above. The plate is associated with means for displacement in the vertical direction and comprises means for simultaneous operation of the folding and gripping components of the set of spindles. The tool is arranged in position on the top end block of at least one fuel assembly, such that the spindles are each engaged onto a sleeve for locking a guide tube of the assembly.

The disengagement and extraction of the locking sleeves from the guide tubes of one or more fuel assemblies may therefore be performed simultaneously, thereby ensuring a considerable saving in time.

Finally, the method according to the invention applies to any demountable fuel assembly for a lightwater nuclear reactor, in which the guide tubes are fixed inside an end block by means of locking sleeves comprising a ferrule for fixing the sleeve inside the end block.

I claim:

1. A method for extracting a locking sleeve (20) from a guide tube (4) in a demountable end block (5) of a fuel assembly of a nuclear reactor cooled by light water, said fuel assembly comprising a bundle of parallel fuel rods held inside a framework (9) formed by guide tubes (4), struts (3) and end blocks (5, 6) fixed onto ends of the guide tubes (4), at least one of the end blocks (5) being fixed onto one of the ends of each of the guide tubes (4) in a demountable manner, by means of an end part (4a) of the guide tube deformable radially and having a securing part (17) projecting radially outwards, engaged inside and over a part of the length of an opening (11) passing through the end block (5) and comprising, in its part receiving the guide tube (4), an annular enlargement (16) receiving the securing part (17) of the guide tube (4), radial expansion of the end of the guide tube and holding of its securing part (17) inside the annular enlargement (16) of the opening (11) of the end block being ensured by a locking sleeve (20) comprising a part for expanding the guide tube (4) and a ferrule (25) for fixing in the end block projecting at the end of the guide tube, in the locked position of the sleeve, inside a part of the opening (11) of the end block not receiving the guide tube, this part of the opening (11) of the end block comprising at least one radial cavity (22) inside which at least one deformed part (29) of the fixing ferrule (25) is introduced by radial deformation of at least one zone of the ferrule (25) coinciding with the cavity (22), so as to ensure fixing of the locking sleeve (20) inside the end block (5), said method comprising the steps of (a) deforming said at least one zone (25a, . . . 25f) of the fixing ferrule (25) comprising a radially projecting deformed part (29) by folding inwards, so as to extract the deformed part (29) from the corresponding cavity (22); and (b) extracting the locking sleeve (20) by exerting a pulling force axially of the guide tube (4).

2. The method as claimed in claim 1, wherein the zones (25a to 25f) of the ferrule (25) comprising deformed parts (29) consist of cylindrical segments separated from one another by slits (26) arranged in the direction of generatrices of the ferrule (25).

3. The method as claimed in claim 2, wherein the inward folding of the cylindrical segments (25a to 25f) forming the fixing ferrule (25) is performed about a line close to a line joining the ferrule (25) and the expansion part (24) of the locking sleeve (20).

4. A method for extracting the locking sleeves (20) from all the guide tubes (4) of a demountable end block (5) of at least one fuel assembly of a nuclear reactor cooled by light water, said fuel assembly comprising a bundle of parallel fuel rods held inside a framework (9) formed by guide tubes (4), struts (3) and end blocks (5, 6) fixed onto ends of the guide tubes (4), at least one of the end blocks (5) being fixed onto one of the ends of each of the guide tubes (4) in a demountable manner, by means of an end part (4a) of the guide tube deformable radially and having a securing part (17) projecting gradially outwards, engaged inside and over a part of the length of an opening (11) passing through the end block (5) and comprising, in its part receiving the guide tube (4), an annular enlargement (16) receiving the securing part (17) of the guide tube (4), radial expansion of the end of the guide tube and holding of its securing part (17) inside the annular enlargement (16) of the opening (11) of the end block being ensured by a locking sleeve (20) comprising a part (24) for expanding the guide tube (4) and a ferrule (25) for fixing in the end block projecting at the end of the guide tube, in the locked position of the sleeve, inside a part of the opening (11) of the end block not receiving the guide tube, this part of the opening (11) of the end block comprising at least one radial cavity (22) inside which at least one deformed part (29) of the fixing ferrule (25) is introduced by means of radial deformation of at least one zone of the ferrule (25) coinciding with the cavity (22), so as to ensure fixing of the locking sleeve (20) inside the end block (5), wherein, for all the locking sleeves of all the guide tubes, the following steps are performed simultaneously:

(a) deformation inwards of the at least one zone (25a, ... 25f) of the fixing ferrules (25) comprising a radially projecting deformed part (29), so as to extract the deformed parts (29) from the corresponding cavities (22); and (b) extraction of the locking sleeves (20) by means of a pulling force axially of the guide tubes (4).

* * * * *